J. K. O'NEIL.
Weighing Scoop.
No. 53,327. Patented March 20, 1866.
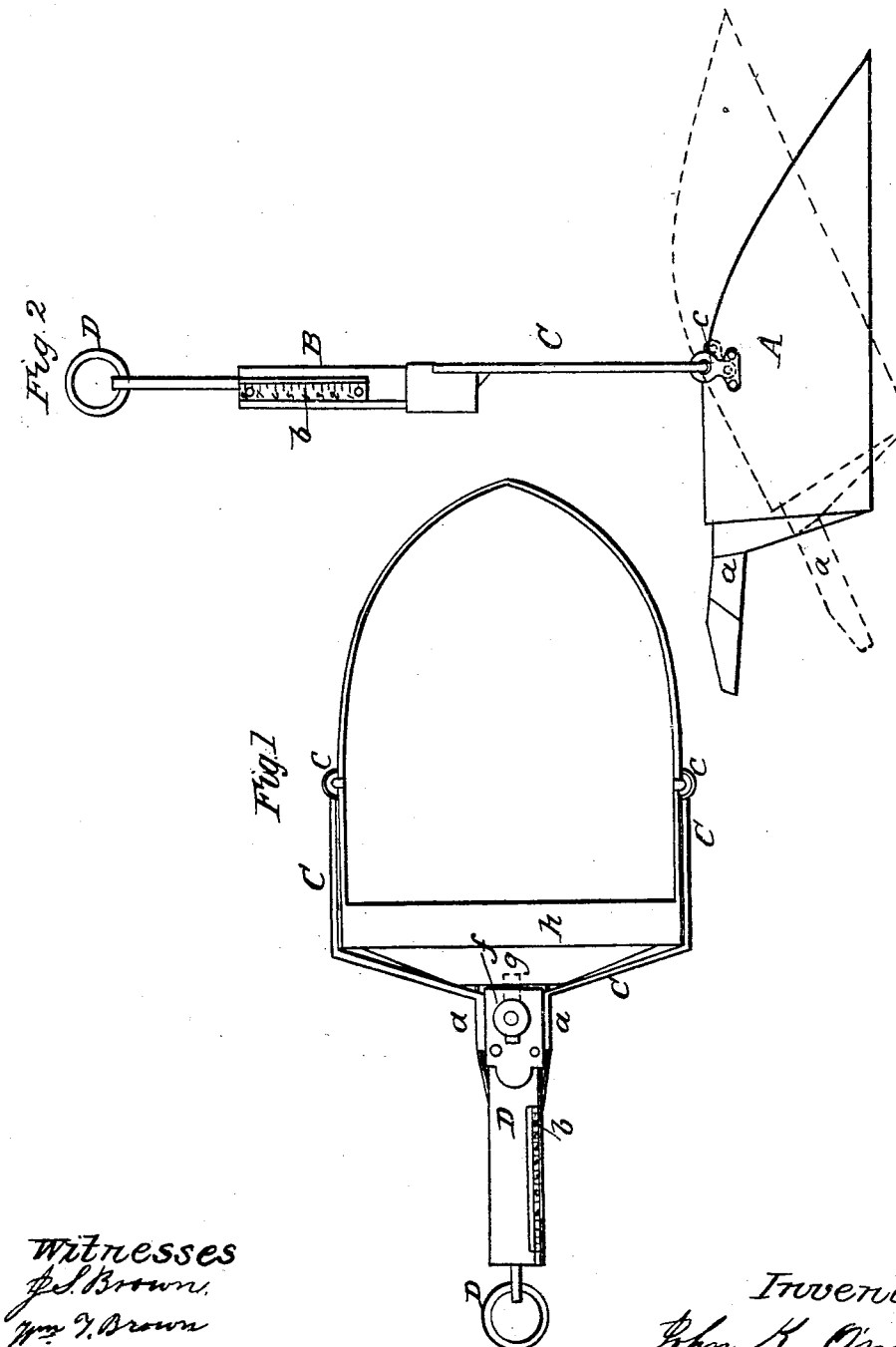

UNITED STATES PATENT OFFICE.

JOHN K. O'NEIL, OF KINGSTON, NEW YORK.

IMPROVEMENT IN WEIGHING-SCOOPS.

Specification forming part of Letters Patent No. 53,327, dated March 20, 1866.

*To all whom it may concern:*

Be it known that I, JOHN K. O'NEIL, of Kingston, in the county of Ulster and State of New York, have invented a new and Improved Scoop or Ladle, intended for weighing substances as they are dipped up for use or sale; and I do hereby declare that the following is a full and exact description thereof, reference being had to the accompanying drawings, making part of this specification—

Figure 1 is a top view of a scoop provided with a balance or other weighing apparatus, when arranged for dipping up; Fig. 2, a side view thereof, as arranged for weighing.

Like letters designate corresponding parts in both figures.

The scoop A may be of the usual form, but may have the back part of it covered, as at $h$, to prevent the spilling of the substance at that end.

Instead of a handle, and in the place thereof, is a socket, $a$, substantially as shown. Into this socket fits the lower or forward end of a spring-balance, B, or any other suitable weighing device. This balance is secured to a bail, C, which is hinged by ears $c\ c$ to the scoop, so that it will be suspended therefrom when the balance is held upright, as in Fig. 2, or so that the back end will a little overbalance the forward end when the scoop has the substance to be weighed in it, as indicated by red lines in Fig. 2. The balance B has a ring, D, to suspend it by, as usual. When the balance is brought down into the handle-socket of the scoop it is fastened there by a spring bolt or catch, $f$, locking under a lip, $g$, at the back end of the scoop. The socket $a$ may reach back nearly or quite as far as the balance, and thus form a part of the handle to lift the scoop by and strengthen it.

The use of the utensil is obvious. When the balance is secured in the handle-socket, as in Fig. 1, the scoop is used precisely as any scoop; but when the scoop is filled with or contains a substance to be weighed, the balance is unlocked from the back end of the scoop and swung up, so as to suspend the scoop, as in Fig. 1. In this position the substance or article is weighed as readily and accurately as with any ordinary scales or balance.

What I claim as my invention, and desire to secure by Letters Patent, is—

A scoop or ladle provided with a balance or equivalent weighing device, B, arranged so as to weigh any substance or article in the scoop, substantially as herein specified.

JOHN K. O'NEIL.

Witnesses:
   J. S. BROWN,
   A. J. HOYT.